US012775788B2

(12) United States Patent
Iyoob et al.

(10) Patent No.: US 12,775,788 B2
(45) Date of Patent: Oct. 27, 2026

(54) MULTI-CLOUD GENERATIVE ARTIFICIAL INTELLIGENCE ARBITRAGE, ORCHESTRATION, AND ACCURACY VALIDATION

(71) Applicant: Kyndryl, Inc., New York, NY (US)

(72) Inventors: Ilyas Iyoob, Pflugerville, TX (US); Venkatapurna Parthasarathy Madhira, Frisco, TX (US); Cesar Augusto Rodriguez Bravo, Alajuela (CR)

(73) Assignee: Kyndryl, Inc., New York, NY (US)

( * ) Notice: Subject to any disclaimer, the term of this patent is extended or adjusted under 35 U.S.C. 154(b) by 200 days.

(21) Appl. No.: 18/582,724

(22) Filed: Feb. 21, 2024

(65) Prior Publication Data

US 2025/0265411 A1 Aug. 21, 2025

(51) Int. Cl.
*G06F 40/20* (2020.01)

(52) U.S. Cl.
CPC .................................... *G06F 40/20* (2020.01)

(58) Field of Classification Search
CPC ....................................................... G06F 40/20
See application file for complete search history.

(56) References Cited

U.S. PATENT DOCUMENTS 12,008,332 B1 * 6/2024 Gardner .................. G06F 40/56
2021/0390426 A1 * 12/2021 Nair ......................... G06N 5/04
2022/0050751 A1 * 2/2022 Hazra ................. G06F 11/1476
2022/0210200 A1 6/2022 Crabtree et al.
2023/0085061 A1 3/2023 Ma et al.
2023/0097897 A1 * 3/2023 Campos ................. G06N 5/022 706/12
2023/0128661 A1 * 4/2023 Ahmed ............... G06F 16/2455 707/769
2023/0135179 A1 5/2023 Mielke et al.
2023/0208869 A1 6/2023 Bisht et al.
2023/0274086 A1 8/2023 Tunstall-Pedoe et al.
2024/0289395 A1 * 8/2024 Zhou ................... G06F 16/9532
2025/0111141 A1 * 4/2025 Ferenczi ................. G06F 40/20
2025/0124236 A1 * 4/2025 Gupta .................... G06F 40/103
2025/0200392 A1 * 6/2025 Whalen .................. G06N 5/013
2025/0217351 A1 * 7/2025 Tan ...................... G06F 16/2423
2025/0245437 A1 * 7/2025 Zhang ..................... G06F 40/20

OTHER PUBLICATIONS

Ji et al., "Survey of Hallucination in Natural Language Generation," arXiv:2202.03629v5 [cs.CL] Nov. 7, 2022, pp. 1-47.

* cited by examiner

*Primary Examiner* — Philip H Lam
(74) *Attorney, Agent, or Firm* — CANTOR COLBURN LLP; Erik Swanson

(57) ABSTRACT

Embodiments relate to automatically providing multi-cloud generative artificial intelligence (AI) arbitrage, orchestration, and accuracy validation. An aspect includes inputting a user prompt to artificial intelligence (AI) models to obtain results and in response to receiving the results from the AI models, determining that at least one incongruent result is found in the results. An aspect includes resolving an issue of the at least one incongruent result in the results, in response to resolving the issue, merging the results to obtain a final result, and presenting the final result.

18 Claims, 13 Drawing Sheets

600

FIG. 9
IF ∑M > 50 & ∑M > (∑N + 20)
Validation = True
M = results that match
N = Results without match

900

MULTI-CLOUD GENERATIVE ARTIFICIAL INTELLIGENCE ARBITRAGE, ORCHESTRATION, AND ACCURACY VALIDATION

BACKGROUND

The present invention generally relates to computer systems, and more specifically, to computer-implemented methods, computer systems, and computer program products configured and arranged to provide multi-cloud generative artificial intelligence (AI) arbitrage, orchestration, and accuracy validation.

Generative artificial intelligence is artificial intelligence capable of generating text, images, or other media using generative models. Generative AI models learn the patterns and structure of their input training data and then generate new data that has similar characteristics. Advances in transformer-based deep neural networks have enabled a number of generative AI systems notable for accepting natural language prompts as input. These include large language model (LLM) chatbots by various organizations.

A generative AI model is constructed by applying unsupervised or self-supervised machine learning to a dataset. The capabilities of a generative AI model depend on the modality or type of dataset used. Generative AI can be either unimodal or multimodal. Unimodal systems take only one type of input, while multimodal systems can take more than one type of input.

SUMMARY

Embodiments of the present invention are directed to computer-implemented methods for providing multi-cloud generative artificial intelligence (AI) arbitrage, orchestration, and accuracy validation. A non-limiting computer-implemented method includes inputting a user prompt to AI models to obtain results, and in response to receiving the results from the AI models, determining that at least one incongruent result is found in the results. The method includes resolving an issue of the at least one incongruent result in the results, and in response to resolving the issue, merging the results to obtain a final result. Further, the method includes presenting the final result.

Other embodiments of the present invention implement features of the above-described methods in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
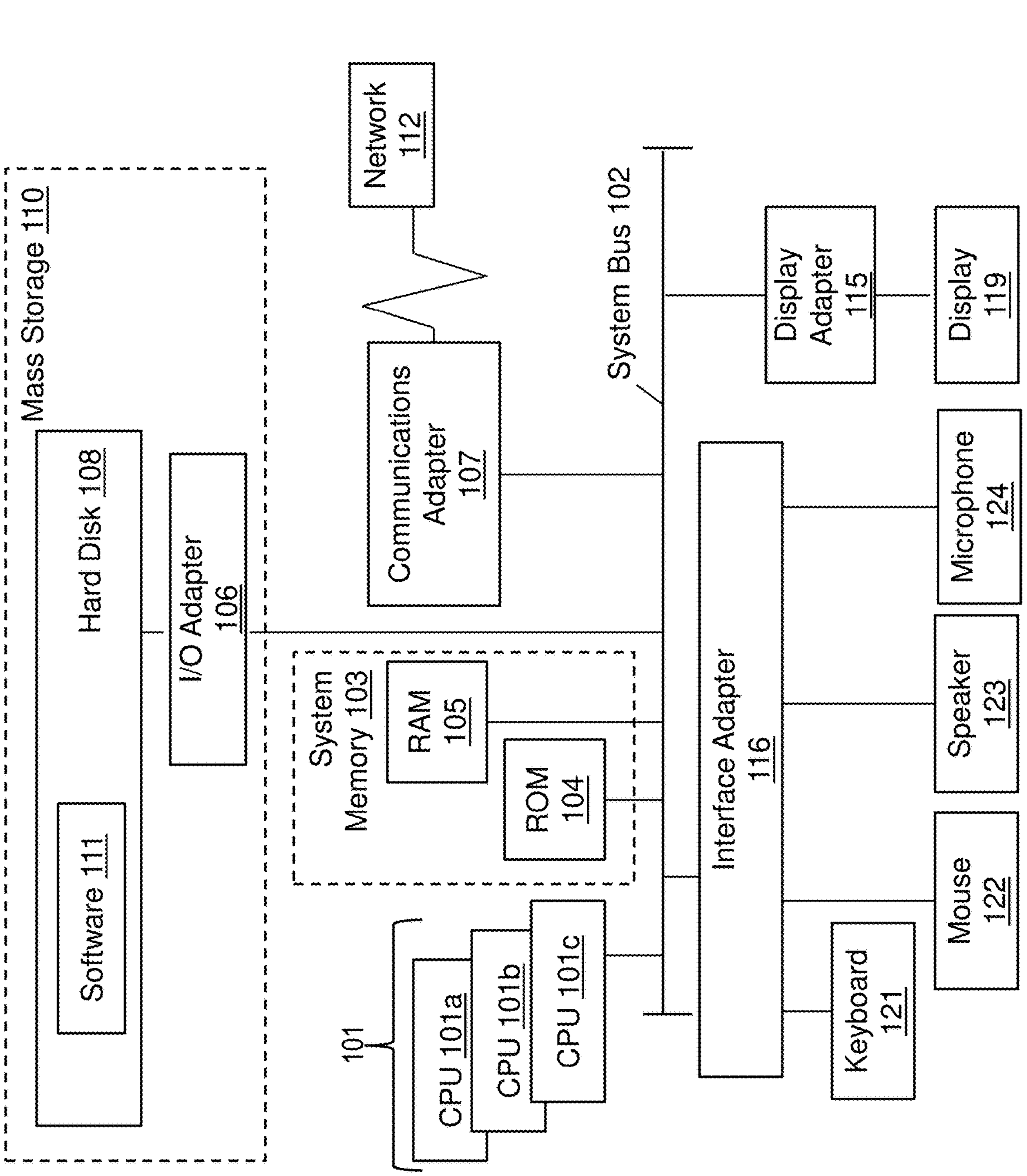
FIG. 1 depicts a block diagram of an example computer system for use in conjunction with one or more embodiments of the present invention.

One or more embodiments automatically provide multi-cloud generative artificial intelligence (AI) arbitrage, orchestration, and accuracy validation. Generative AI models are provided by several companies or organizations, and each generative AI model has its own strengths and weaknesses. While generative AI tools are useful, they may still have issues, which are AI hallucinations and inaccurate results. AI hallucinations are incorrect or misleading results that can be generated by generative AI models.

Technical solutions and benefits include novel techniques to improve generative AI models and avoid these issues. One or more embodiments are configured to identify the results from a number of generative AI models for the same prompt and correlate the results to determine incongruencies. A number of generative AI models can include two or more generative AI models. One or more embodiments can use techniques such as an Internet or web search to validate potential incongruent data found in the results. The system can remove the incongruent and unvalidated data from the number of generative AI results. Also, one or more embodiments can validate links present in the generative AI results to reduce the risk of fabricated links. The system is configured to capture the validated results and parse the validated results using a large language model (LLM) engine to create a consolidated response based on the number of validated results. Moreover, technical solutions and effects improve results of generative AI models by providing techniques to discover and remove inaccurate results and AI hallucinations, thereby improving computer systems, reliability of generative AI models, and user experiences (UX). Some embodiments may not have these potential advantages and these potential advantages are not necessarily required of all embodiments.

One or more embodiments described herein can utilize machine learning techniques to perform tasks, such as classifying a feature of interest. More specifically, one or more embodiments described herein can incorporate and utilize rules-based decision making and artificial intelligence (AI) reasoning to accomplish the various operations described herein, namely classifying a feature of interest. The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a "trained neural network," "trained model," "a trained classifier," and/or "trained machine learning model") can be used for classifying a feature of interest. In one or more embodiments, machine learning functionality can be implemented using an Artificial Neural Network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional Neural Networks (CNN) are a class of deep, feed-forward ANNs that are particularly useful at tasks such as, but not limited to analyzing visual imagery and natural language processing (NLP). Recurrent Neural Networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101*a*, 101*b*, 101*c*, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction are discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, a microphone 124, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, storage capability including the system memory 103 and the mass storage 110, input means such as the keyboard 121, the mouse 122, and the microphone 124, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
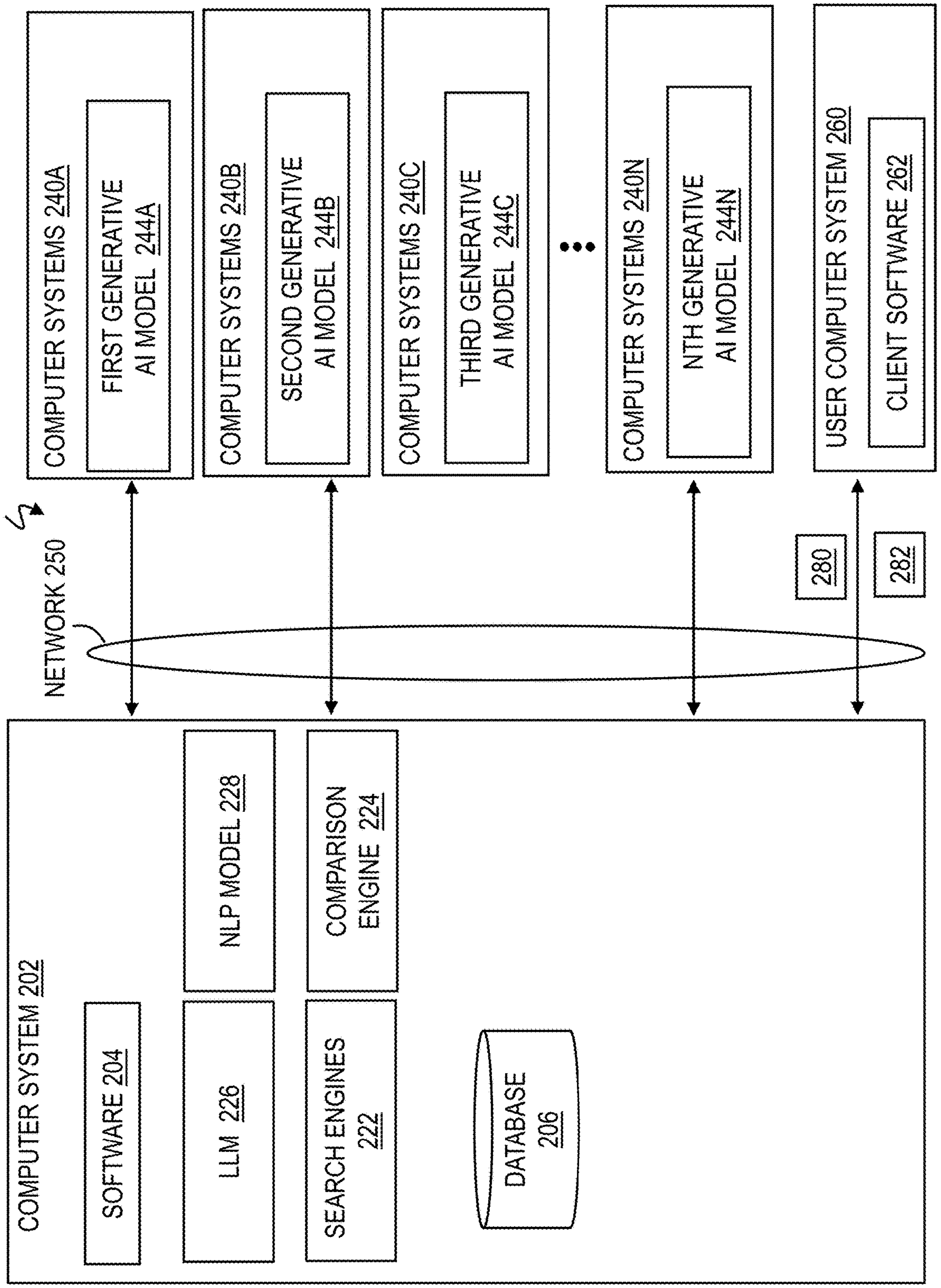
FIG. 2 depicts a block diagram of an example system for automatically providing multi-cloud generative artificial intelligence (AI) arbitrage, orchestration, and accuracy validation and presenting a validated final result to a user device according to one or more embodiments of the present invention.

FIG. 2 depicts a block diagram of an example system 200 configured for automatically providing multi-cloud generative artificial intelligence (AI) arbitrage, orchestration, and accuracy validation and presenting a validated final result to a user device according to one or more embodiments. The system 200 includes one or more computer systems 202 configured to communicate over a network 250 with many different computer systems, such as a computer system 240A for providing access to a first generative AI model 244A, a computer system 240B for providing access to a second generative AI model 244B, a computer system 240C for providing access to a third generative AI model 244C, through a computer system 240N for providing access to an Nth generative AI model 244N. The generative AI models 244A, 244B, 244C through 244N can generally be referred to as generative AI models 244. The computer systems 240A, 240B, 240C through 240N can generally be referred to as computer systems 240 and are utilized to receive requests and provide responses via their respective generative AI models 244. The requests input to the generative AI models 244 can be interchangeably referred to as queries, prompts, etc. The responses generated by the generative AI models 244 can be interchangeably referred to as results, responses, answers, output, etc., as understood by one of ordinary skill in the art. The computer system 202 communicates with one or more user computer systems 260 over the network 250 to provide validated results from the generative AI models 244, after processing according to one or more embodiments.

The computer system 202, computer systems 240, software 204, search engines 222, text comparison engine 224, LLM 226, natural language processing (NLP) model 228, client software 262, etc., can include functionality and features of the computer system 100 in FIG. 1 including various hardware components and various software applications such as software 111 which can be executed as instructions on one or more processors 101 in order to perform actions according to one or more embodiments of the invention. The software 204, as well as any other software discussed herein, can include, be integrated with, and/or call various other pieces of software, algorithms, application programming interfaces (APIs), etc., to operate as discussed herein. The software 204 may be representative of numerous software applications designed to work together.

The computer system 202 may be representative of numerous computer systems and/or distributed computer systems configured to automatically provide multi-cloud generative artificial AI arbitrage, orchestration, and accuracy validation services to users of the user computer systems 260. The users of the user computer systems 260 may register in advance for services and set up user profiles with computer system 202. The computer system 202 and computer systems 240 can be part of a cloud computing environment such as a cloud computing environment 50 depicted in FIG. 11, as discussed further herein. The network 250 can be a wired and/or wireless communication network.

Figure 3A:
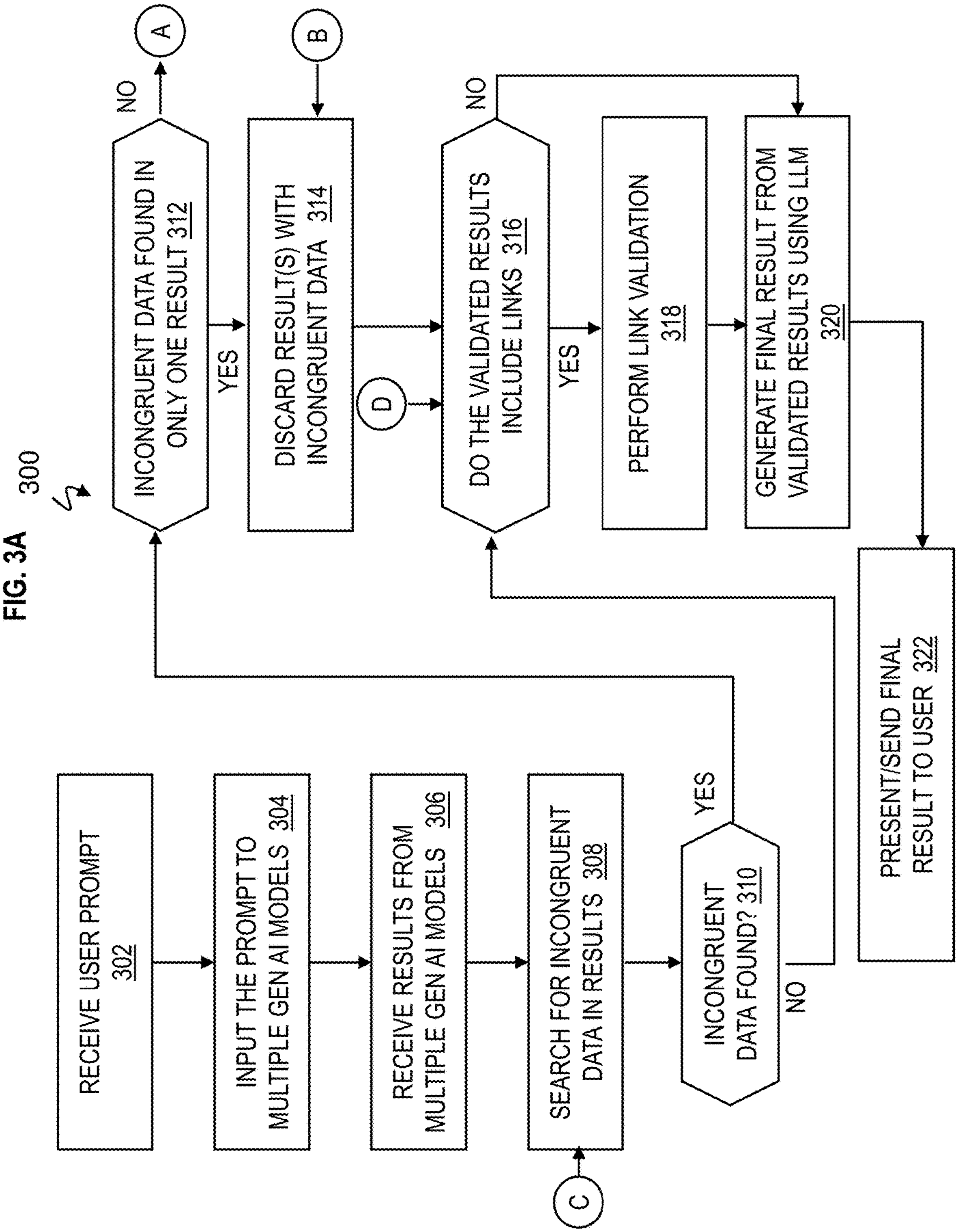
FIGS. 3A and 3B depict a flowchart of a computer-implemented method for providing multi-cloud generative AI arbitrage, orchestration, and accuracy validation and presenting a validated final result to a user device according to one or more embodiments of the present invention.
Figure 3B:
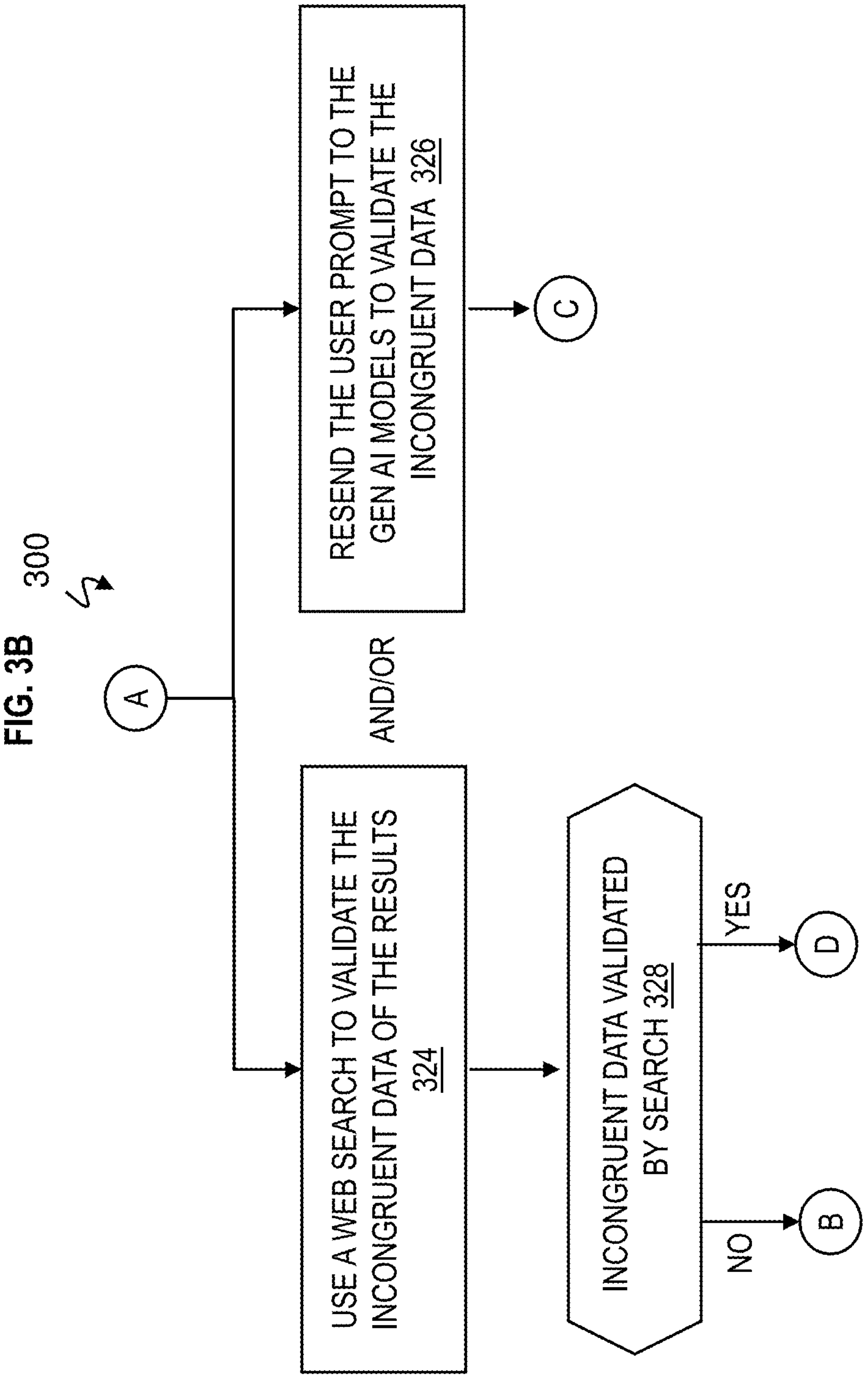

FIGS. 3A and 3B depict a flowchart of a computer-implemented method 300 for automatically providing multi-cloud generative artificial AI arbitrage, orchestration, and accuracy validation services to users of the user computer systems 260 according to one or more embodiments. The computer-implemented method 300 is executed by the computer system 202 and can cause actions to be performed on the computer systems 240 and user computer system 260. Reference can be made to any figures discussed herein.

At block 302 of the computer-implemented method 300, the software 204 of computer system 202 is configured to receive user prompts from any of the user computer systems 260. Prompts are the inputs or queries that a user or a program gives to an AI model, in order to elicit a specific response from the AI model. A prompt can be natural language text describing the task that an AI model should perform. A user prompt 280 can be received from client software 262 of the user computer system 260. The user prompt 280 can be any type of communication including text, voice, video, gestures, etc., that is sent from the client software 262 to the software 204. In some cases, a voice message can be converted to text before sending or after being received by the software 204. The software 204 may employ, call, and/or instruct a speech-to-text engine (not shown) to covert the audio to text as understood by one of ordinary skill in the art. Also, sign language or gestures can be converted to text using suitable software. The user computer system 260 can be representative of any type of user device including phones, tablets, smartwatches, smart glasses, AI pins, smart clothing, Internet-of-things (IoT) devices, etc. The user computer system 260 can be implemented in vehicles, airplanes, homes, appliances, etc. The client software 262 may include and/or be coupled to a user interface providing a user experience, allowing the user to interact with the client software 262 and the software 204.

At block 304, the software 204 is configured to input the prompt to multiple generative AI models 244 in order to have responses generated. At block 306, the software 204 is configured to receive multiple results from the generative AI models 244 and search for incongruent data in the received results at block 308.

At block 310, the software 204 is configured to check if incongruent data was found in the results. The software 204 can call, employ, and/or be integrated with any known text comparison software for determining the incongruent data among the results from the generative AI models 244. There could be an incongruent result having the incongruent data from one of the generative AI models 244. In one example, the NLP model 228 and/or text comparison engine 224 may be utilized to determine the topics or subject matter of the results and to determine differences and similarities among the results. One or more of the results can be determined to have incongruent data. Any known software algorithms and machine learning models can be utilized to search for and find the incongruent data as understood by one of ordinary skill in the art.

Figure 4:
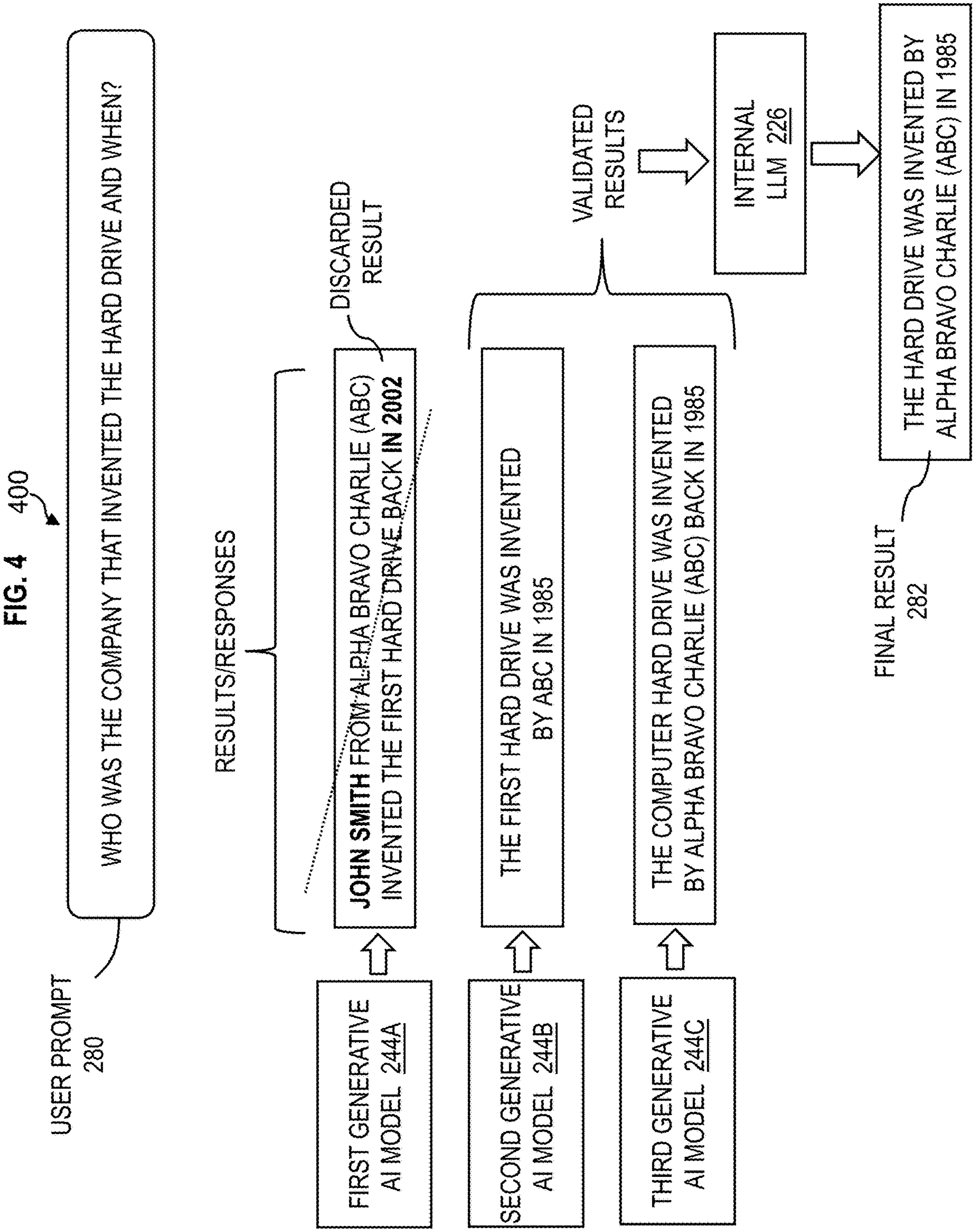
FIG. 4 depicts an example scenario in a block diagram according to one or more embodiments of the present invention.

FIG. 4 depicts an example scenario in block diagram 400 according to one or more embodiments. In the example, the software 204 inputs a user prompt 280 to the first generative AI model 244A, the second generative AI model 244B, and the third generative AI model 244C, each of which output results/responses. In the example scenario, the software 204 may determine that the result from the first generative AI model 244A contains incongruent data using any suitable technique.

Referring to FIG. 3A, when (No) incongruent data is not found in the results, flow proceeds to block 316. When (Yes) incongruent data is found in the results, the software 204 is configured to check if the incongruent data is found in only one result at block 312. When (No) the incongruent data is found in more than one of the results, flow proceeds to blocks 324 and 326 in FIG. 3B.

When (Yes) the incongruent data is found in only one of the results, the software 204 is configured to discard the result having the incongruent data at block 314. As noted herein, the result from the first generative AI model 244A contains the incongruent data in the example scenario in FIG. 4. Accordingly, once the software 204 determines that only the result generated by the first generative AI model 244A has the incongruent data, the software 204 is configured to discard the result from the first generative AI model 244A, thereby validating the remaining results, for example, the results for the second and third generative models 244B and 244C in FIG. 4. Discarding the single result having the incongruent data automatically validates the remaining results that do not have incongruent data.

Referring to FIG. 3A, at block 316, the software 204 is configured to check whether the validated results include links (e.g., hyperlinks, URLs, references, etc.). If no links are present, flow proceeds to block 320. One of the most common types of hallucinations are expressed by links to nonexistent pages. Accordingly, when links are present, the software 204 is configured to check all links to ensure that those resources referred to via the links are real at block 318. In one or more embodiments, the link validation can include the software 204 performing two checks. As the first check, the software 204 is configured to check if the page for the link exists, for example, does the link respond to a ping. For example, the software 204 can ping the Internet protocol (IP) address for the link. The software 204 may receive a successful response back or an unsuccessful response back from the ping. An example successful response to the ping may be GET 200 OK. If the ping is unsuccessful, the software 204 discards the link. As the second check, when the ping is successful for the link, the software 204 is configured to open the page and fetch the content. The software 204 and/or any other software called by the software 204 can then correlate the content with the generative AI response. If there is a match in content, the software 204 marks the link as valid. If the content is not related or the content cannot be gathered, the software 204 discards the link. This process occurs until all links have been validated or discarded from use.

Figure 5:
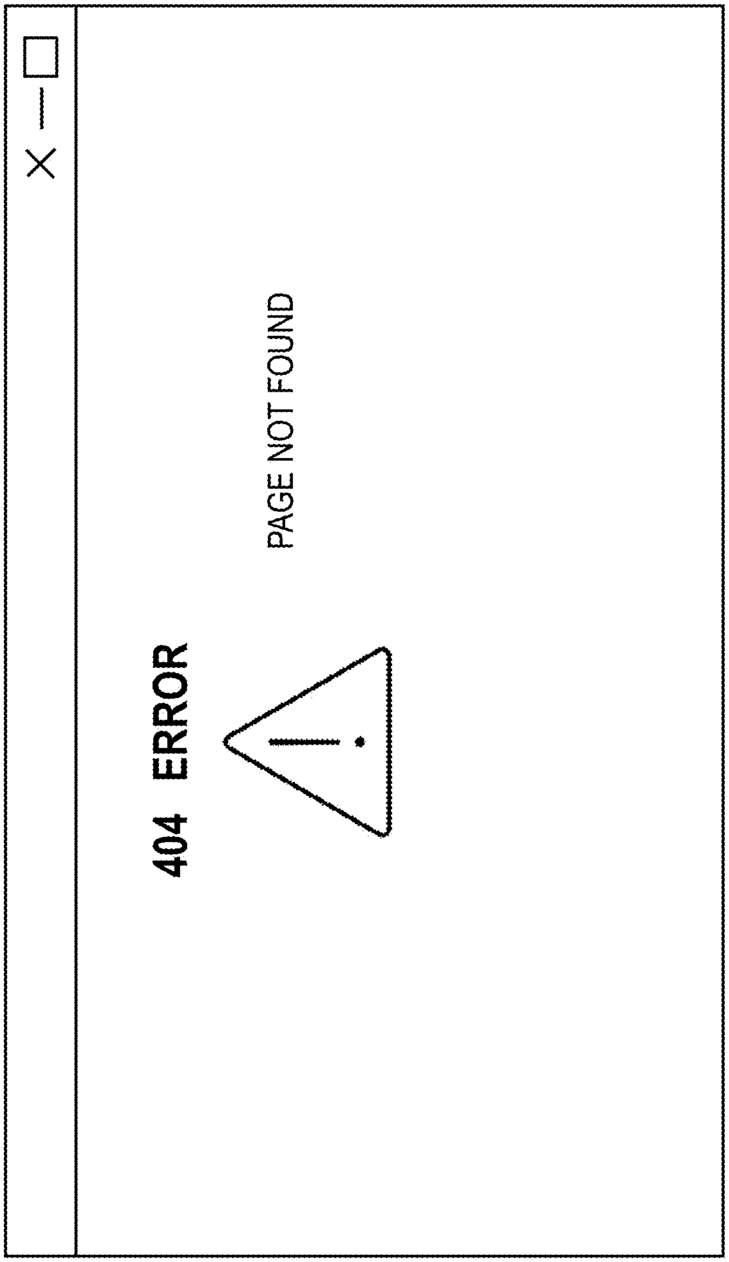
FIG. 5 depicts an example scenario in a block diagram according to one or more embodiments of the present invention.

FIG. 5 depicts an example scenario in block diagram 500 according to one or more embodiments. In the example scenario, the software 204 performed the first check for the link, which is successful. This means that the page is alive. However, the page is a 404 page, meaning that the page does not exist. Therefore, during the second check of opening the page and fetching the content, the software 204 determines that the text on the page is not related to the text generated in the result by the generative AI model 244. As such, the software 204 is configured to discard the link.

Referring to FIG. 3A, at block 320, the software 204 is configured to process the validated results to generate a final result using LLM 226. For example, the validated results of the generative AI models 244 can be input to the LLM 226 with a request to combine the results into a final result 282. At block 322, after receiving the final result 282 from the LLM 226, the software 204 is configured to transmit the final result 282 to client software 262 of the user computer system 260 and cause the final result 282 to be presented to the user of the user computer system 260 that initially sent the user prompt 280. The final result 282 can be presented to the user in any form. The final result 282 may be played as audio (e.g., read aloud), displayed as text, played as audio and video, presented as a hologram, etc., along with any combination of presentation such that the user receives the final result 282. Returning to the example scenario in FIG. 4, it can be seen that the validated results of the second and third generative AI models 244B and 244C have been processed by the LLM 226, which outputs the final result 282 as "The hard drive was invented by Alpha Bravo Charlie (ABC) in 1985."

Figure 6:
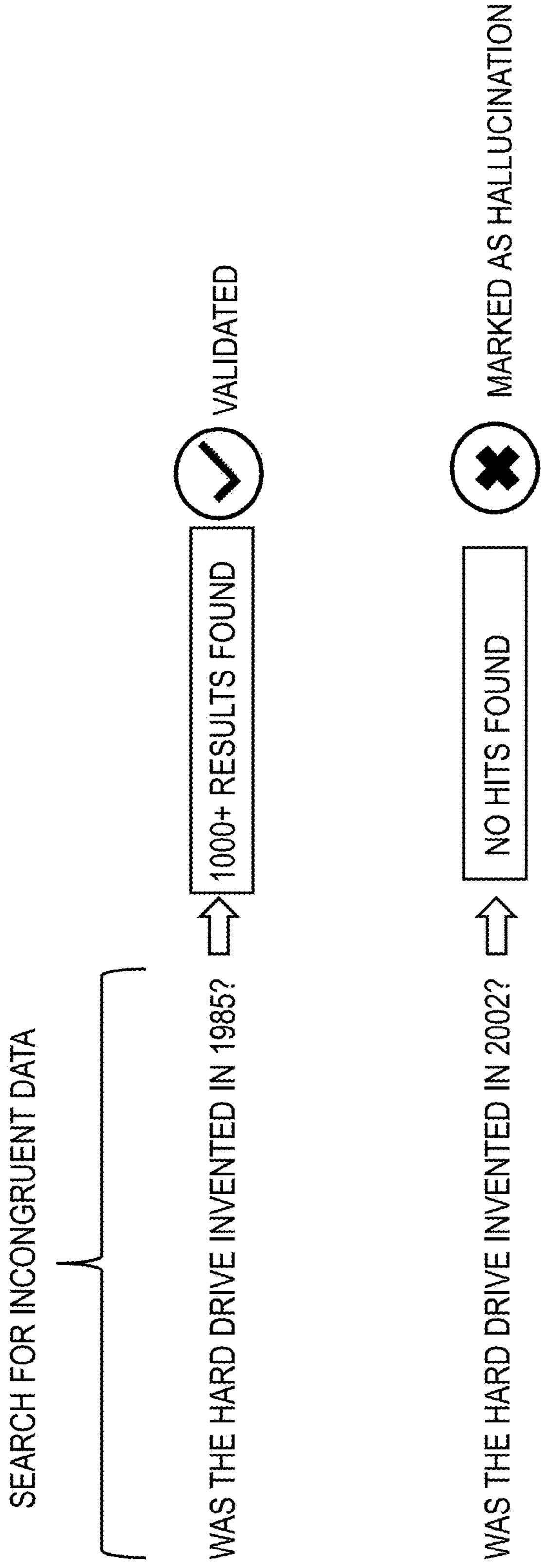
FIG. 6 depicts an example scenario in a block diagram according to one or more embodiments of the present invention.

Referring to FIG. 3B, when incongruent data is found in more than one result of the generative AI models 244, the software 204 is configured to perform a search to validate the incongruent data of the results at block 324. The search can be a web search, an Internet search, and/or any type of database search. For instance, one or more suitable search engines 222 may be utilized to search the Internet for the incongruent data in the results. To further illustrate, FIG. 6 depicts an example scenario in block diagram 600 according to one or more embodiments. In the example scenario in FIG. 6, the software 204 searches, for example, the Internet for the two pieces of incongruent data in the results, based on the points or subject matter at which the results differ. At block 328, the software 204 is configured to confirm which pieces of the incongruent data were confirmed/validated and which are rejected, based on the search results. As can be seen in FIG. 6, one search of incongruent data returned 1000 or more hits/search results, and the software 204 is configured to determine that the number of hits/results is greater than a predetermined threshold of hits/search results. Accordingly, the software 204 is configured to validate this incongruent data as correct, and flow proceeds to block 316 to process the validated results. On the other hand, the other search of another piece of incongruent data returned no (0) hits/search results as depicted in FIG. 6, which is less than the predetermined threshold of hits/search results. Accordingly, the software 204 is configured to reject this piece of incongruent data (along with the corresponding result from the generative AI model), which is marked as an AI hallucination in FIG. 6. As such, any results from generative AI models having the rejected piece of incongruent data are discarded at block 314.

Figure 7:
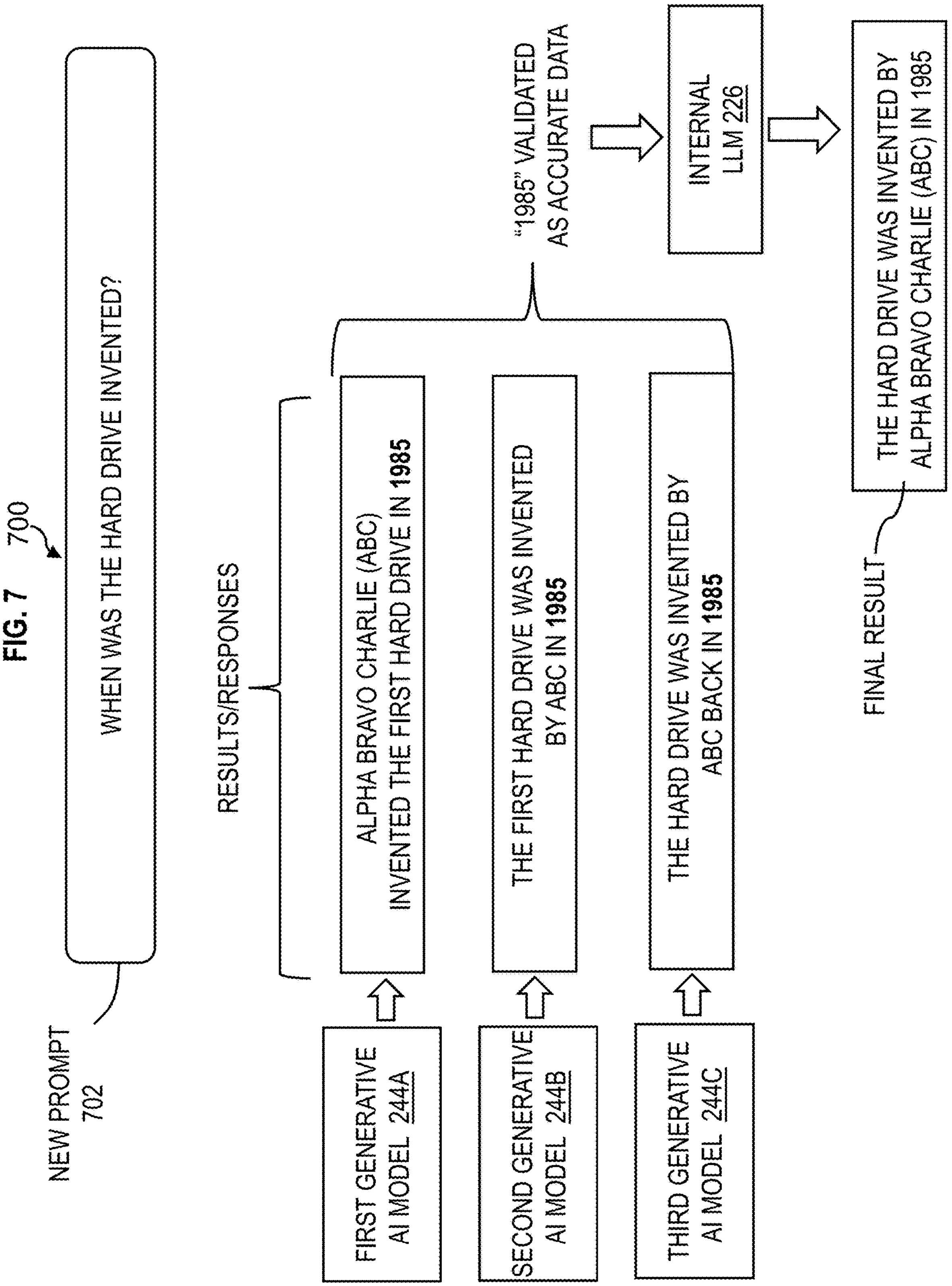
FIG. 7 depicts an example scenario in a block diagram according to one or more embodiments of the present invention.

Referring to FIG. 3B, when incongruent data is found in more than one result of the generative AI models 244, the software 204 is configured to resend the user prompt 280 to the generative AI models 244 to validate the incongruent data of the results at block 326. According to one or more embodiments, FIG. 7 depicts an example scenario in block diagram 700 of handling a case in which several pieces of incongruent data are found in the results from the generative AI models 244 after processing the user prompt 280. The software 204 is configured to create a new prompt 702 requesting for the incongruent data to be processed by the generative AI models 244. The new results from the generative AI models 244 are utilized to confirm which data is a hallucination as it is statistically unlikely (or improbable) that the same generative AI models 244 have the same hallucinations in two different interactions. In the example scenario, the new prompt 702 is "When was the hard drive invented?" in order to question/test the incongruent data. As seen in FIG. 7, the date of "1985" for the hard drive is validated as correct and/or accurate data, after comparing the results from each of the generative AI models 244 and finding no incongruent data. As seen above, the correct data was identified, and the AI hallucination regarding the date did not reoccur.

Now, another scenario could be that the generative AI models 244 output mixed results again, which means there is incongruent data. The software 204 may perform one or more of the three following actions. First, the software 204 can submit the (same) user prompt 280 again to the same generative AI models 244 utilized originally. As noted, it is statistically improbable for a generative AI model to have the same AI hallucination. Second, the software 204 can submit the (same) user prompt 280 to backup generative AI models 244 that were not originally utilized. For example, the software 204 can search a database 206 for additional generative AI models 244, which can be a set of backup generative AI models 244 that are utilized when this additional validation is initiated. For example, the backup generative AI models 244 could be more expensive, require registration/credentials, etc., and the company may wish to reduce/limit their use due to the cost. However, the backup generative AI models 244 can serve as a good alternative to be used for this type of validation. Third, the software 204 can perform an Internet search for the incongruent data for a web validation as discussed herein.

Figure 8:
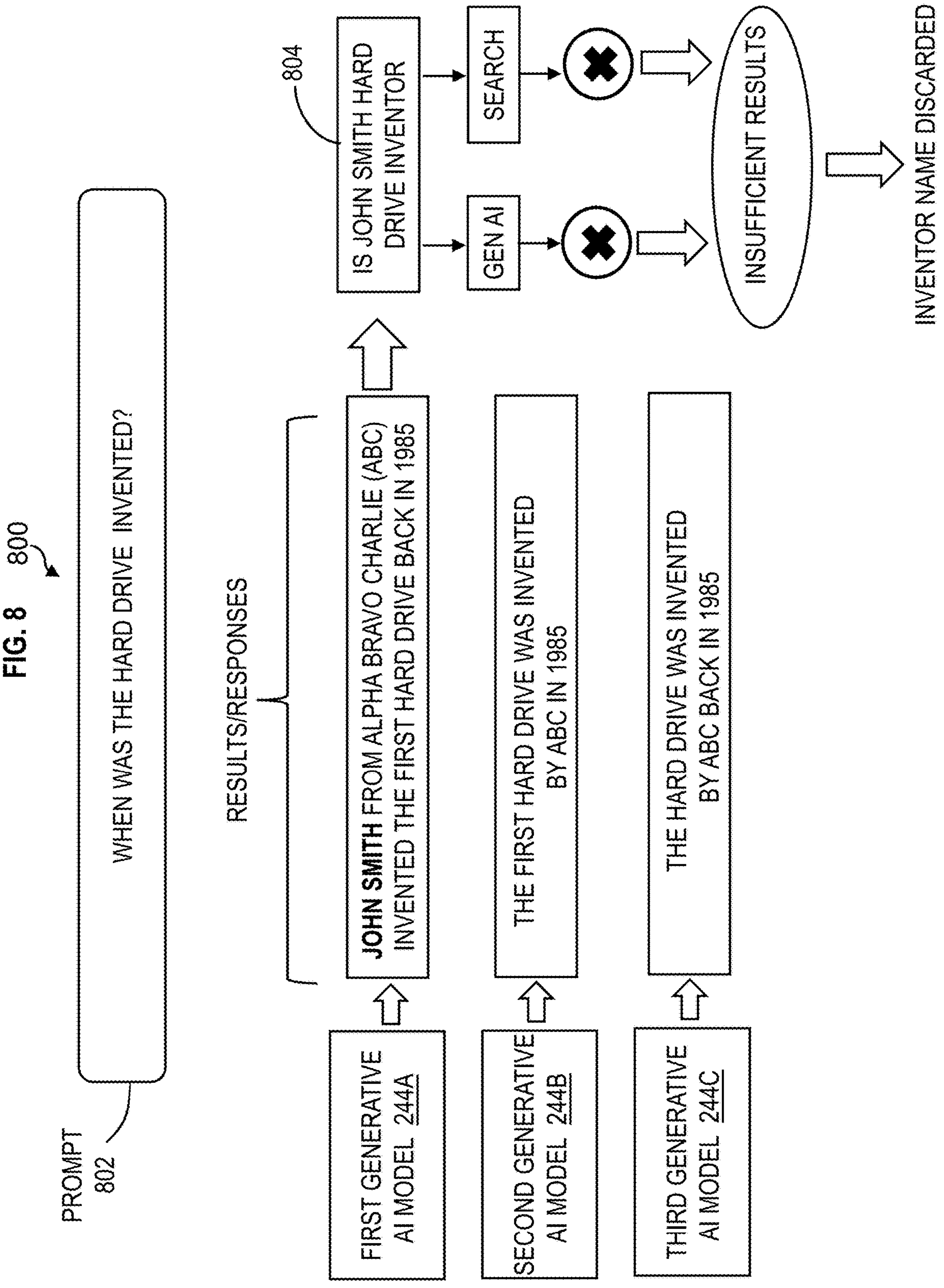
FIG. 8 depicts an example scenario in a block diagram according to one or more embodiments of the present invention.

A case is considered in which there are mixed results from the generative AI models 244 where one or more of the results include data this is not present in other results for a prompt 802. As discussed herein, the incongruent data, not present in other results, can be included as additional and accurate data, or rejected as inconsistent data or an AI hallucination. To further illustrate, FIG. 8 depicts an example scenario in block diagram 800 for checking if additional data, not present in other results, is additional and accurate data or if the additional data is inconsistent data or an AI hallucination. In the example scenario in FIG. 8, the software 204 can provide a prompt 802 to the generative AI models 244, which is "When was the hard drive invented?" The dates are consistent in the results, but one of the results from the generative AI models 244 has additional data about a potential name of the inventor of the hard drive. Using NLP model 228 and/or any other semantic text comparison software, the software 204 determines that there is additional data and creates a new prompt 804 (or search terms) that inquires if John Smith is the hard drive inventor, because the name of the inventor is the issue of the incongruent data. At this point, the incongruent data is additional data. Analogous to blocks 324 and 326, the software 204 is configured to input the new prompt 804 to the generative AI models 244 and the search engines 222.

Using the results from the generative AI models 244 for the new prompt 804, the software 204 can then determine if the results match the name "John Smith" for the inventor of hard drive. If the results match, then the name of the inventor of the hard drive is validated, and the additional data remains. Otherwise, the name of the inventor of the hard drive is rejected. Also, using the search results from the search engines 222, the software 204 can then determine if search results identify the name "John Smith" as the inventor of hard drive greater than a predetermined threshold. If the search results identify the same name of the inventor of the hard drive greater than the predetermined threshold, the name of the inventor of the hard drive is validated. Otherwise, the name of the inventor of the hard drive is rejected. FIG. 8 presents the example in which the validation fails in both the results from the generative AI models 244 and the search results from the search engines 222. In one or more embodiments, validation in either one of the checks would be sufficient to validate the name "John Smith" as the inventor of hard drive. In one or more embodiments, validation is required in both checks.

Figure 9:
FIG. 9 depicts an example scenario in a block diagram according to one or more embodiments of the present invention.

As further details regarding search results, FIG. 9 depicts an example scenario in block diagram 900 for providing an example validation formula for incongruent data with search results from search engines 222. Continuing the example scenario of FIG. 8, only one result mentions the inventor's name (e.g., John Smith), and accordingly, the software 204 is configured to execute a web search to validate the name of the inventor. In the example, the software 204 can gather the top 100 search results and then apply the example formula: if $\Sigma$ M>50 and $\Sigma$ M> ($\Sigma$+20), then validation is true. Otherwise, the validation is false. In the example formula, M=search results that match and N=search results without match. It can be seen that the additional data is accepted as valid when the additional data matches approximately 80% of the search results. It should be appreciated that the threshold could be increased or decreased as desired.

Figure 10:
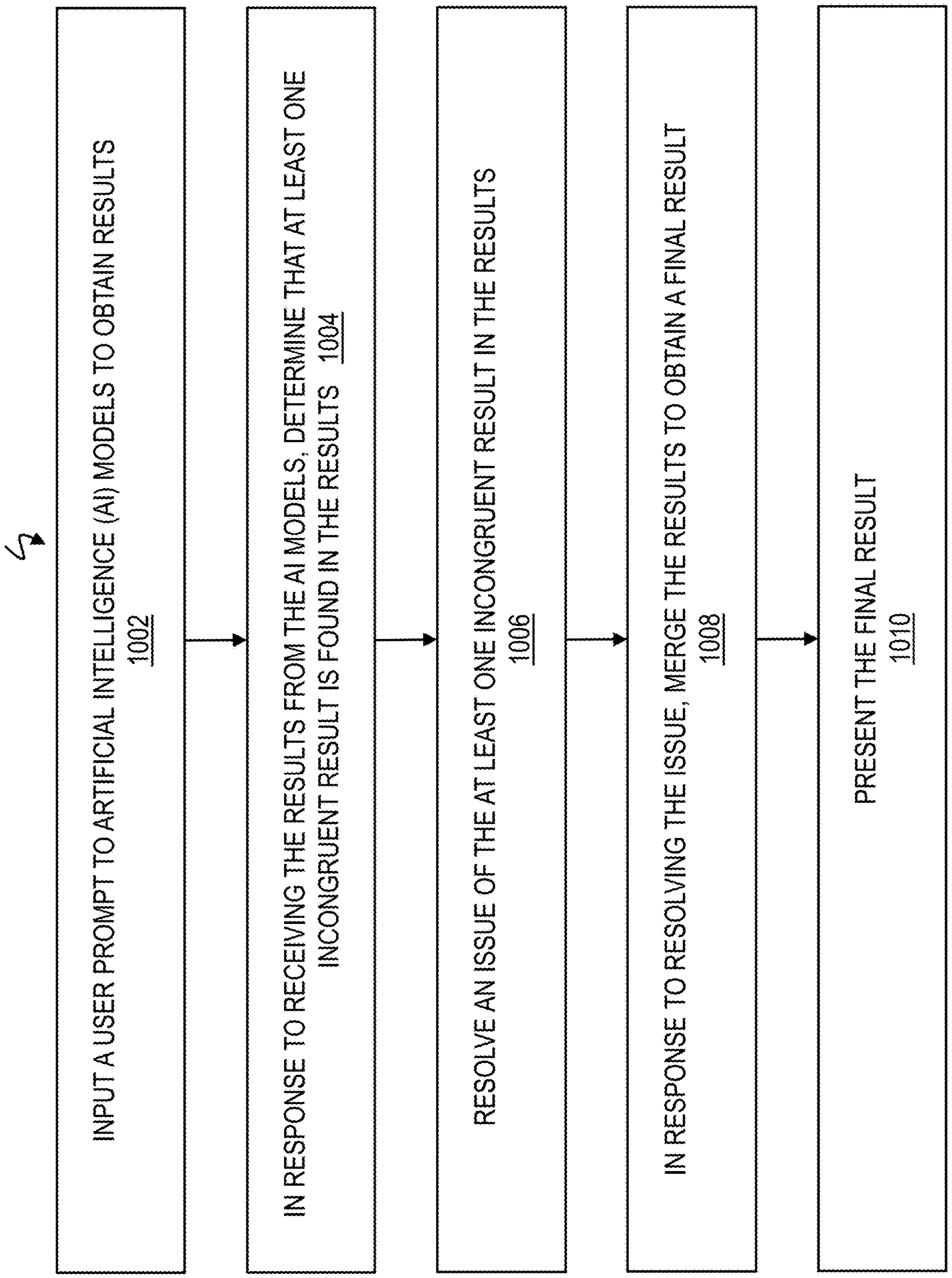
FIG. 10 depicts a flowchart of a computer-implemented method for automatically providing multi-cloud generative AI arbitrage, orchestration, and accuracy validation and presenting a validated final result to a user device according to one or more embodiments of the present invention.

FIG. 10 is a flowchart of a computer-implemented method 1000 for automatically providing multi-cloud generative artificial intelligence (AI) arbitrage, orchestration, and accuracy validation and presenting a validated final result to a user device according to one or more embodiments. Reference can be made to any figures discussed herein. The computer-implemented method 1000 can be performed by computer system 202.

At block 1002, the software 204 of computer system 202 is configured to input a user prompt 280 to generative AI models 244 to obtain results. At block 1004, the software 204 is configured to, in response to receiving the results from the generative AI models 244, determine that at least one incongruent result is found in the results. At block 1006, the software 204 is configured to resolve an issue of the at least one incongruent result in the results. At block 1008, the software 204 is configured to, in response to resolving the issue, merge the results to obtain a final result 282, and present the final result 282 to a user computer system 260 of the user at block 1010.

In one or more embodiments, determining that the at least one incongruent result is found in the results includes performing a comparison of the results to determine the at least one incongruent result. Resolving the issue of the at least one incongruent result in the results includes excluding the at least one incongruent result from the results.

Resolving the issue of the at least one incongruent result in the results includes performing a web search (e.g., with search engines 222) using incongruent data of the at least one incongruent result to obtain search results. In response to receiving the search results, the software 204 is configured to confirm the results as valid without including the incongruent data of the at least one incongruent result, thereby rejecting the incongruent data. In response to receiving the search results, the software 204 is configured to confirm the results as valid with the incongruent data of the at least one incongruent result.

According to one or more embodiments, resolving the issue of the at least one incongruent result in the results includes: generating a new prompt based on incongruent data in the at least one incongruent result; inputting the new prompt to the generative AI models 244 to obtain new results; and based on the new results, either validating the results are correct with the at least one incongruent data included or validating the results are correct with the at least one incongruent data excluded.

Resolving the issue of the at least one incongruent result in the results includes: re-inputting the user prompt to the generative AI models 244 to generate new results; determining that the at least one incongruent result is not found in the new results; and using the new results as the results to obtain the final result. Resolving the issue of the at least one incongruent result in the results includes: inputting the user prompt to other generative AI models 244 to generate new results and using the new results as the results to obtain the final result. Merging the results to obtain the final result includes using a large language model (e.g., LLM 226) to consolidate the results into the final result.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
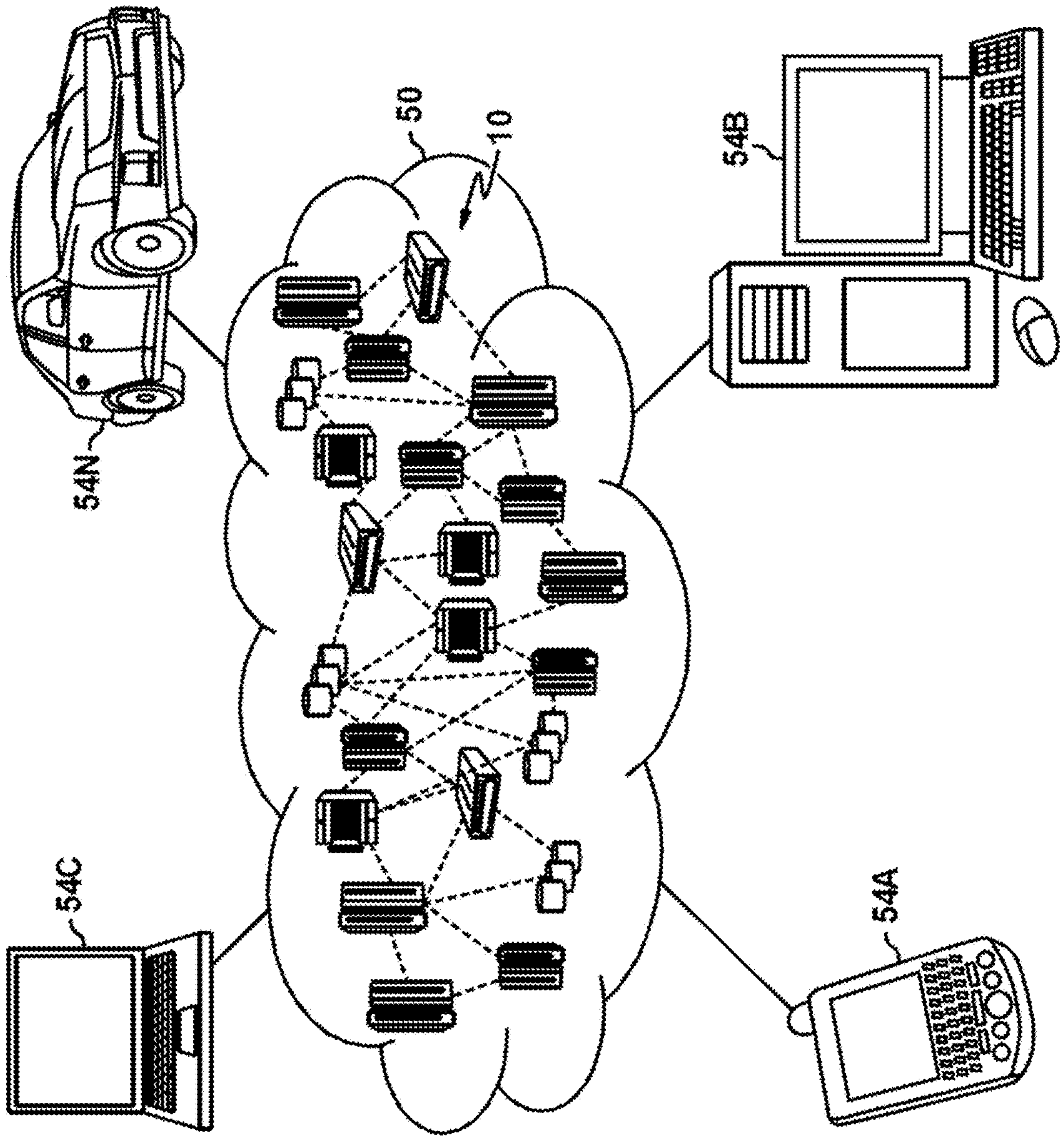
FIG. 11 depicts a cloud computing environment according to one or more embodiments of the present invention.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
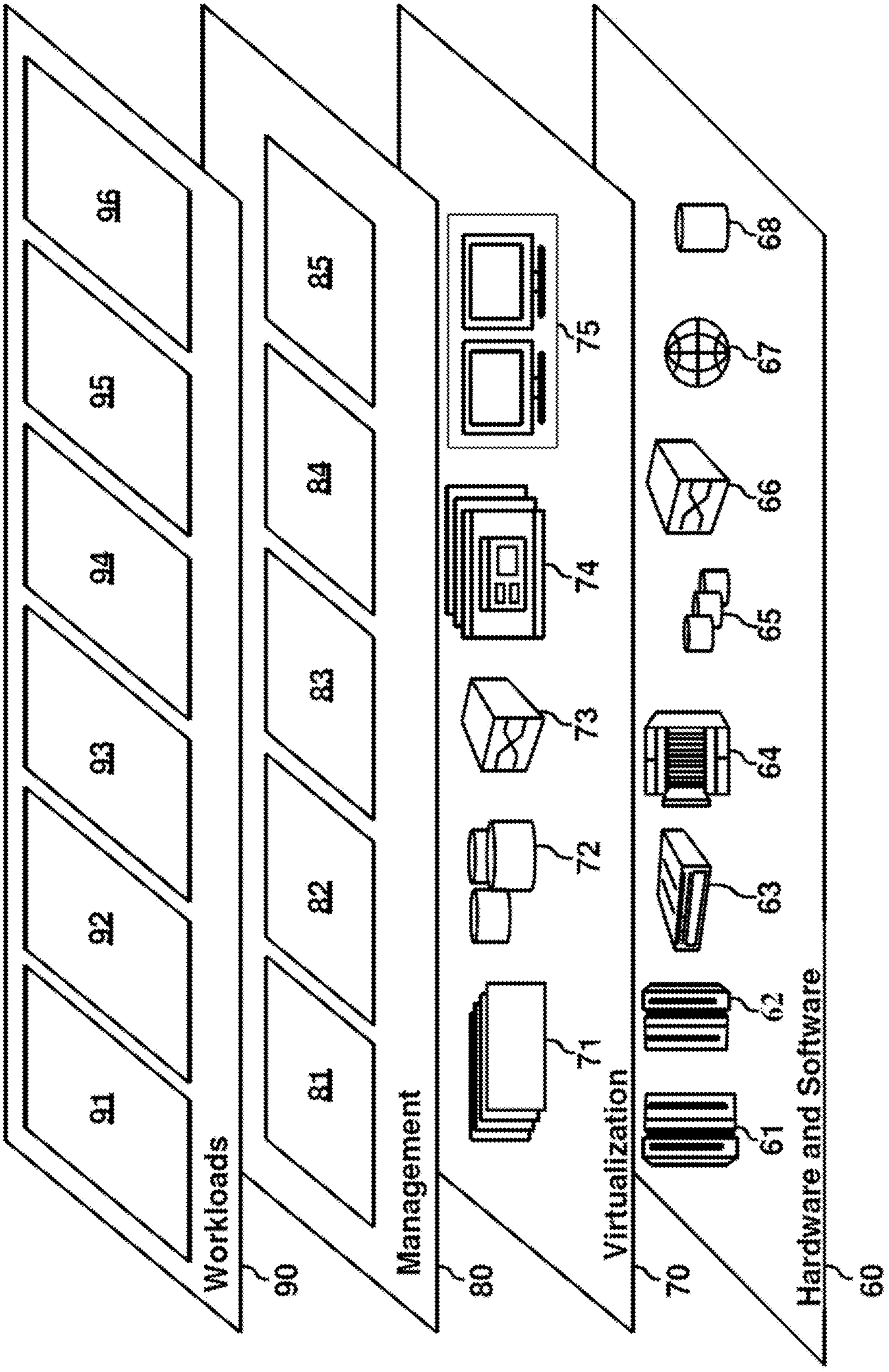
FIG. 12 depicts abstraction model layers according to one or more embodiments of the present invention.

Referring now to FIG. 12, a set of functional abstraction layers provided by cloud computing environment 50 (depicted in FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of #8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
- communicating by software of a computer system with a user device of a user, such that the computer system receives a user prompt having been input into a user interface of the user device, wherein the user device registers in advance for validation services with the computer system;
- inputting, by the computer system, the user prompt to artificial intelligence (AI) models running on a plurality of different computer systems to obtain results, the AI models comprising a first AI model and a second AI model;
- in response to receiving the results from the AI models, determining that incongruent results are found in the results of the first AI model and the second AI model;
- resolving an issue of the incongruent results in the results, wherein the resolving comprises:
  - the software searching a database for at least one backup AI model running on at least one computer system in which the at least one backup AI model requires credentials, in response to determining that the incongruent results are found in the results, wherein the software is configured to search the database for the at least one backup AI model upon a validation initiation;
  - the software causing the user prompt to be input into the at least one backup AI model requiring the credentials in order to generate at least one result;
  - in response to determining a first part and a second part of the incongruent results respectively corresponding to the first AI model and the second AI model, the software performing a first web search using the first part to obtain first search results and a second web search using the second part to obtain second search results, where the first and second parts are in disagreement; and
  - the software determining that the first search results meet a predetermined search hit threshold for the first web search and the second search results fail to meet the predetermined search hit threshold for the second web search;
- in response to resolving the issue, merging the at least one result with the first part and the results to obtain a final result; and
- causing, by the computer system, the final result to be output on a speaker and display of the user device as at least one of audio, displayed text, or a hologram.

2. The computer-implemented method of claim 1, wherein determining that the incongruent results are found in the results comprises performing a comparison of the results to determine the incongruent results.

3. The computer-implemented method of claim 1, wherein resolving the issue of the incongruent results in the results comprises excluding the incongruent results from the results.

4. The computer-implemented method of claim 1, further comprising, in response to receiving search results, confirming the results as valid without including incongruent data of the incongruent results.

5. The computer-implemented method of claim 1, further comprising, in response to receiving search results, confirming the results as valid with incongruent data of the incongruent results.

6. The computer-implemented method of claim 1, wherein resolving the issue of the incongruent results in the results comprises:
- generating a new prompt based on incongruent data in the incongruent results;
- inputting the new prompt to the AI models to obtain new results; and
- based on the new results, either validating the results are correct with the incongruent data included or validating the results are correct with the incongruent data excluded.

7. The computer-implemented method of claim 1, wherein resolving the issue of the incongruent results in the results comprises:
- re-inputting the user prompt to the AI models to generate new results;
- determining that the incongruent results are not found in the new results; and
- using the new results as the results to obtain the final result.

8. The computer-implemented method of claim 1, wherein resolving the issue of the incongruent results in the results comprises:
- inputting the user prompt to other AI models to generate new results; and
- using the new results as the results to obtain the final result.

9. The computer-implemented method of claim 1, wherein merging the results to obtain the final result comprises using a large language model to consolidate the results into the final result.

10. A system comprising:
- one or more memories having computer readable instructions; and one or more processors for executing the computer readable instructions, the computer readable instructions controlling the one or more processors to perform operations comprising:

communicating by the computer readable instructions of the system with a user device of a user, such that the system receives a user prompt having been input into a user interface of the user device, wherein the user device registers in advance for validation services with the system;

inputting the user prompt to artificial intelligence (AI) models running on a plurality of different computer systems to obtain results, the AI models comprising a first AI model and a second AI model;

in response to receiving the results from the AI models, determining that incongruent results are found in the results of the first AI model and the second AI model;

resolving an issue of the incongruent results in the results, wherein the resolving comprises:

the computer readable instructions searching a database for at least one backup AI model running on at least one computer system in which the at least one backup AI model requires credentials, in response to determining that the incongruent results are found in the results, wherein the computer readable instructions are configured to search the database for the at least one backup AI model upon a validation initiation;

the computer readable instructions causing the user prompt to be input into the at least one backup AI model requiring the credentials in order to generate at least one result;

in response to determining a first part and a second part of the incongruent results respectively corresponding to the first AI model and the second AI model, the computer readable instructions performing a first web search using the first part to obtain first search results and a second web search using the second part to obtain second search results, where the first and second parts are in disagreement; and the computer readable instructions determining that the first search results meet a predetermined search hit threshold for the first web search and the second search results fail to meet the predetermined search hit threshold for the second web search;

in response to resolving the issue, merging the at least one result and the results to obtain a final result; and causing, by the system, the final result to be presented on the user device as at least one of audio, displayed text, or a hologram.

11. The system of claim 10, wherein determining that the incongruent results are found in the results comprises performing a comparison of the results to determine the incongruent results.

12. The system of claim 10, wherein resolving the issue of the incongruent results in the results comprises excluding the incongruent results from the results.

13. The system of claim 10, wherein the one or more processors perform the operations further comprising, in response to receiving search results, confirming the results as valid without including incongruent data of the incongruent results.

14. The system of claim 10, wherein the one or more processors perform the operations further comprising, in response to receiving search results, confirming the results as valid with incongruent data of the incongruent results.

15. The system of claim 10, wherein resolving the issue of the incongruent results in the results comprises:

generating a new prompt based on incongruent data in the incongruent results;

inputting the new prompt to the AI models to obtain new results; and based on the new results, either validating the results are correct with the incongruent data included or validating the results are correct with the incongruent data excluded.

16. The system of claim 10, wherein resolving the issue of the incongruent results in the results comprises:

re-inputting the user prompt to the AI models to generate new results;

determining that the incongruent results are not found in the new results; and using the new results as the results to obtain the final result.

17. A computer program product comprising one or more computer readable storage media having program instructions embodied therewith, the program instructions executable by one or more processors to cause the one or more processors to perform operations comprising:

communicating by the program instructions executable by the one or more processors with a user device of a user, such that the program instructions receive a user prompt having been input into a user interface of the user device, wherein the user device registers in advance for validation services with the computer system;

inputting, by the one or more processors, the user prompt to artificial intelligence (AI) models running on a plurality of different computer systems to obtain results, the AI models comprising a first AI model and a second AI model;

in response to receiving the results from the AI models, determining that incongruent results are found in the results of the first AI model and the second AI model;

resolving an issue of the incongruent results in the results, wherein the resolving comprises:

the program instructions searching a database for at least one backup AI model running on at least one computer system in which the at least one backup AI model requires credentials, in response to determining that the incongruent results are found in the results, wherein the program instructions are configured to search the database for the at least one backup AI model upon a validation initiation;

the program instructions causing the user prompt to be input into the at least one backup AI model requiring the credentials in order to generate at least one result;

in response to determining a first part and a second part of the incongruent results respectively corresponding to the first AI model and the second AI model, the program instructions performing a first web search using the first part to obtain first search results and a second web search using the second part to obtain second search results, where the first and second parts are in disagreement; and program instructions determining that the first search results meet a predetermined search hit threshold for the first web search and the second search results fail to meet the predetermined search hit threshold for the second web search;

in response to resolving the issue, merging the at least one result and the results to obtain a final result; and causing, by the program instructions, the final result to be presented on the user device as at least one of audio, displayed text, or a hologram.

18. The computer program product of claim 17, wherein determining that the incongruent results are found in the results comprises performing a comparison of the results to determine the incongruent results.

* * * * *